United States Patent [19]

Ishikawa et al.

[11] 4,075,114
[45] Feb. 21, 1978

[54] FLEXIBLE GRAPHITE MATERIAL CONTAINING BORIC ACID

[75] Inventors: Toshikatsu Ishikawa, Tokyo; Tanaka Junichi, Yokohama; Haruo Teranishi, Machida; Shinichiro Kondo, Yokohama, all of Japan

[73] Assignee: Nippon Carbon Co., Ltd., Tokyo, Japan

[21] Appl. No.: 666,390

[22] Filed: Mar. 12, 1976

[30] Foreign Application Priority Data

Mar. 24, 1975 Japan ................................. 50-35176

[51] Int. Cl.$^2$ ...................... C01B 31/04; C04B 35/54; B29G 1/00
[52] U.S. Cl. ........................................ 252/62; 264/42; 264/332; 423/448; 423/460; 427/113; 428/408
[58] Field of Search .......................... 428/408; 252/62; 264/65, 332, 42, 109, 319, 325; 423/448, 460; 427/113, 114

[56] References Cited

U.S. PATENT DOCUMENTS

| 1,137,373 | 4/1915 | Aylsworth | 117/DIG. 11 |
|---|---|---|---|
| 1,991,487 | 2/1935 | Bemis | 427/114 |
| 3,632,708 | 1/1972 | Mandorf et al. | 264/332 X |
| 3,852,107 | 12/1974 | Lorkin et al. | 427/113 |

*Primary Examiner*—Harris A. Pitlick
*Attorney, Agent, or Firm*—Frank J. Jordan

[57] ABSTRACT

A process for producing flexible graphite material comprises incorporating expanded graphite material with boric acid, compression molding the resulting mixture and, if desired, heating the resulting molding while under compression. This invention also relates to the flexible graphite material produced by the process.

5 Claims, No Drawings

FLEXIBLE GRAPHITE MATERIAL CONTAINING BORIC ACID

This invention relates to a process for producing flexible graphite material and more particularly to a process for producing flexible graphite material in the form of sheets, tapes, rings, blocks or the like and to the flexible graphite material produced thereby.

Flexible graphite material of this invention in the form of plates, tubes, blocks or the like may be used as heat conductive material, heat insulating material, radiation shields, resistance heating bodies and chemically inert gaskets and packing.

There has heretofore been disclosed a process for producing flexible graphite material by keeping graphite particles in an oxidizing atmosphere or medium at a suitable temperature for a suitable period of time, thereafter washing with water and further subjecting to heat treatment to obtain an expanded graphite material which is then compressed or compacted without the use of a binding material to an extent that the compressed or compacted graphite material has a density of 80 kg/m$^3$ (Japanese Patent Gazette No. 23966/69).

If however, a very high pressure is not applied to the expanded graphite material in such conventional process then the resulting compacted graphite material will not have a high density nor will it be satisfactory as regards specific resistance, mechanical strength, impermeability to gases, and the like. Therefore, there is a need for flexible graphite material provided with desirable properties which is produced without the requiring use of such very high pressure as mentioned above.

The present inventors have made studies in attempts to find a process for the production of flexible graphite material having such desirable properties as above and, as a result of their studies, they have found that a mixture prepared by adding boric acid to expanded graphite material may be compression molded thereby to easily obtain graphite material having high density as well as remarkably improved specific resistance and the like, thus achieving the objectives of this invention.

The crux of this invention resides in an improved flexible graphite material and a process for producing the same characterized by adding boric acid to expanded graphite material to form a mixture, pressure molding the mixture and then heating the thus-obtained molding under pressure.

The expanded graphite material used herein may be obtained by treating natural graphite, pyrolytic graphite or Kish graphite with nitric acid, chromic acid, sodium nitrate, potassium permanganate or a mixture of sulphuric and nitric acids as well as bromine, a halogenide (such as $AlCl_3$, $FeCl_3$, $CuCl_2$, $BCl_3$, $AlBr_3$ or $ZrCl_4$) or the like, thereby forming interlayer compounds in the starting graphite. Generally speaking, materials having a structure wherein the crystal lattice is not dense but has many voids, tend to absorb various other molecules in the voids. Graphites have a particular multi-layer structure of carbon; the bond between carbon molecules in the layer planes of carbon is very strong thereby forming dense layer planes, while the bond in the direction perpendicular to the layer planes is weak thereby leaving relatively large spaces between the layers. For this reason, graphites allow foreign reaction products to enter the gap between the layers to combine with the layer planes of carbon thereby forming interlayer compounds without losing or impairing the multi-layer structure of carbon. Graphite particles in which the interlayer compounds are formed may be enlarged as regards the gap in the direction perpendicular to the carbon layers, by thermally treating the graphite particles at a high temperature (such as 1200° C) whereby the interlayer compounds are allowed to evolve gases therefrom thus forming gas pressures. Assuming that the direction perpendicular to the carbon layers is hereinafter referred to as "c direction", the expanded graphite material used herein should have c direction expansions preferably 5 – 400 times, more preferably at least 20 times that of the original c direction dimension; that is, the expanded graphite material may be obtained by enlarging the starting graphite material as regards its interlayer distance.

Boric acid may be used in solution in a solvent such as methanol, ethanol, acetone, water or the like, for impregnation of the expanded graphite material therewith, and it may be added to the expanded graphite material in amounts of preferably 3 – 15% by weight thereof. The effect obtainable by the use of boric acid will not be remarkable when the acid is used in amounts of less than 3% by weight, while the use of the acid in amounts of more than 15% is not desirable since it attenuates the expanded graphite material in concentration, resulting in the production of a molded graphite material having degraded flexibility.

The solvents for boric acid may be used in such amounts as to form a saturated or approximately saturated solution of boric acid therein. After mixing the expanded graphite material with the solution of boric acid, the solvent may be removed from the mixture by natural evaporation at ambient temperatures or by forced distillation under heat or at elevated temperatures; the solvent may preferably be removed by firstly natural evaporation at ambient temperatures, secondly raising slowly the temperature of the mixture by heating and finally heating the mixture under agitation to a temperature not lower than the boiling point of the solvent thereby entirely removing the solvent.

The pressure used for the pressure molding may be at least 80 kg/cm$^2$, preferably 80 – 250 kg/cm$^2$, and the compression molding may preferably be effected by the use of a hot press. The temperature used for the compression molding may be 600° C or higher, preferably 1,500° – 2,400° C.

As mentioned above, according to this invention, when incorporated in carbon particles having a multi-layer structure, boric acid would not only have the carbon articles activated thereby securely bonding the particles to one another but also have itself at least partly bridged or crosslinked with the carbon particles to form a carbide, whereby the boric acid-incorporated carbon material is made flexible and it may be molded under a slight pressure to produce therefrom high-density flexible carbon material which is lower in specific electrical resistance than conventional ones and is highly impermeable to gases.

The flexible graphite materials of this invention have a bulk density of 1.7 – 2.2 g/cc, tensile strength of 160 – 450 kg/cm$^2$, and elastic modulus or tensile modulus of 5,000 – 10,000 kg/cm$^2$.

This invention will be better understood by the following non-limitative Examples.

EXAMPLE 1

One hundred grams of natural graphite (70 – 90% by weight of the grapite ranging from −24 to + 48 mesh in particle size) were reacted with 500 ml of sulphuric acid (97%wt.) and 50 g of sodium nitrate for 16 hours in a mixture of the acid and nitrate to obtain a reaction product which was thoroughly washed with water, dried and heat treated at 1300° C for 10 seconds thereby obtaining expanded graphite material having c direction expansions about 300 times that of the original c direction dimension.

Four (4.0) grams of the thus-obtained expanded graphite material were incorporated with a solution of 0.4g boric acid in about 40 g methanol to form a mixture which was then agitated for about 5 minutes, subjected to natural evaporation at ambient temperature for partial removal of the solvent and heated to 100° C for completing the removal thereof.

The thus-obtained homogeneous mixture of the boric acid and the expanded grahite material was charged into a vehicle (outer diameter 110 mm × inner diameter 60 mm × length 100 mm) by the use of a hot press of an induction heating type and compression molded under a pressure of 100 kg/cm² to form a molding. The molding so formed was raised in temperature under said pressure, kept at a pressure of 200 kg/cm² after the temperature exceeded 1000° C, further raised in temperature to 2000° C at this pressure, kept at this temperature and the same pressure for 10 minutes and than allowed to cool at still the same pressure.

The molded flexible graphite material so obtained had the following properties:

| | |
|---|---|
| Bulk density | 1.9 g/cc |
| Tensile strength | 200 kg/cm² |
| Elastic modulus (or Tensile modulus) | 9600 kg/cm² |
| Specific resistance (in the direction perpendicular to the direction of compression) | $1 \times 10^{-6} \Omega \cdot cm$ |

This molded flexible graphite material did not exhibit any change in properties even after immersed in boiling water for 24 hours.

COMPARATIVE EXAMPLE 1

The procedure of Example 1 was followed except that boric acid was not used, to obtain a molded graphite material. The properties of the molded graphite material so obtained were as follows:

| | |
|---|---|
| Bulk density | 1.6 g/cc |
| Tensile strength | 120 kg/cm² |
| Elastic modulus | 4000 kg/cm² |
| Specific resistance | $1 \times 10^{-5} \Omega \cdot cm$ |

From the foregoing it is seen that the molded flexible graphite material obtained in Example 1 is excellent in the various properties as compared with that obtained in Comparative example 1 and that the incorporation of boric acid in the expanded graphite material is remarkably effective in the production of excellent flexible graphite material.

EXAMPLE 2

Fifteen (15.0) grams of the same expanded graphite material as used in Example 1 were incorporated with a solution of 0.75 g boric acid in 70 g methanol to form a mixture which was then stirred thoroughly for 10 minutes and heated to 100° C and dried to be freed from the methanol by evaporation. The mixture so dried was molded into a ring-like shape (outer dia. 50 mm × inner dia. 30 mm × thickness 5.5 mm) at a molding pressure of 150 kg/cm² by the use of a hot press of an induction heating type. The ring-like molding so obtained was raised in temperature to 1000° C at the same pressure as above, further raised in temperature to 2000° C at an increased pressure of 200 kg/cm², kept at these temperature and pressure for 10 minutes and then allowed to cool at the same pressure. The molded flexible graphite material so obtained had a bulk density of 2.0 g/cc and impermeability to helium at a reduced pressure of $10^{-6}$ mmHg. In contrast, a molded graphite material was obtained by following the procedure of Example 2 except that boric acid was not used; the molded graphite material so obtained had a bulk density of 1.8 g/cc and impermeability to helium at reduced pressures of down to $10^{-5}$ mm Hg but was permeable to helium at reduced pressures of lower than $10^{-5}$ mm Hg.

From the above it is appreciated that the products of this invention are superior in properties to the Comparative ones.

What is claimed is:

1. A process for producing flexible graphite material comprising incorporating expanded graphite material with boric acid in amounts of 3-15 % by weight thereof, and compression molding the mixture.

2. A process according to claim 1, wherein the compression molding is effected at 80-250 kg/cm².

3. A process for producing flexible graphite material comprising incorporating expanded graphite material with boric acid in amounts of 3-15 % by weight thereof, compression molding the mixture, and heating the compression molded mixture while under compression pressure.

4. A process according to claim 3, wherein the compression molding is effected at 80-250 kg/cm².

5. A process according to claim 3, wherein the heating is effected at 600° – 2,400° C.

* * * * *